United States Patent [19]

Schulte et al.

[11] 4,008,626
[45] Feb. 22, 1977

[54] LINKAGES FOR MOVING AND RETAINING A CONTROL LEVER TO AND IN A NON-USE POSITION

[75] Inventors: Gary Lee Schulte, Dubuque; Edwin Lee Whisler, Peosta, both of Iowa

[73] Assignee: Deere & Company, Moline, Ill.

[22] Filed: Sept. 10, 1975

[21] Appl. No.: 612,188

[52] U.S. Cl. ................................ 74/491; 74/532; 180/82 A
[51] Int. Cl.² ......................................... G05G 1/00
[58] Field of Search .............. 74/491, 473, 471 XY, 74/526, 532; 180/82 A, 111, 112

[56] References Cited

UNITED STATES PATENTS

| 3,431,792 | 3/1969 | Smith | 74/481 |
| 3,691,867 | 9/1972 | Bradshaw | 74/491 |

*Primary Examiner*—Samuel Scott
*Assistant Examiner*—F. D. Shoemaker

[57] ABSTRACT

A control linkage for controlling operation of a control valve of a remote hydraulically operated device is mounted in a vehicle cab and includes a control lever located between the vehicle seat and a door to the cab so as to be within easy reach of a seated operator. When in a normal working position, the lever is located such that it may present an obstacle to operator entry and exit and may be accidently bumped so as to effect actuation of the control valve. In order to prevent this accidental actuation of the control valve, the control linkage includes a safety lever or bar movable between a first position wherein it holds a locking element away from the control lever and extends in blocking relationship to the path of movement of the operator between the seat and door opening, and a second position wherein it is disposed so as to be clear of the path of movement of an operator between the seat and the door and holds a locking element in engagement with the control lever so as to hold the latter in a stored or non-use position out of the path of movement of the operator. The safety lever is inter-connected with the control lever such that when the safety bar is moved from its first to its second position the control lever will move from its normal neutral position to its stored position for locking engagement by the locking element.

4 Claims, 2 Drawing Figures

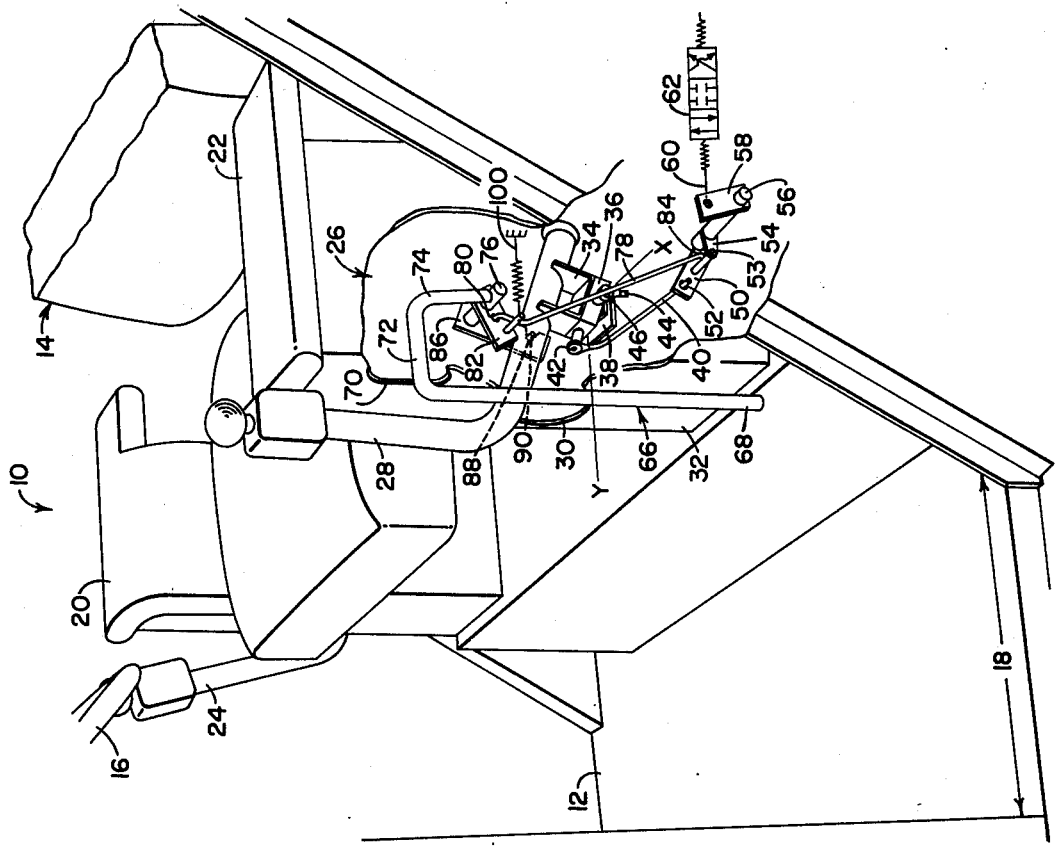
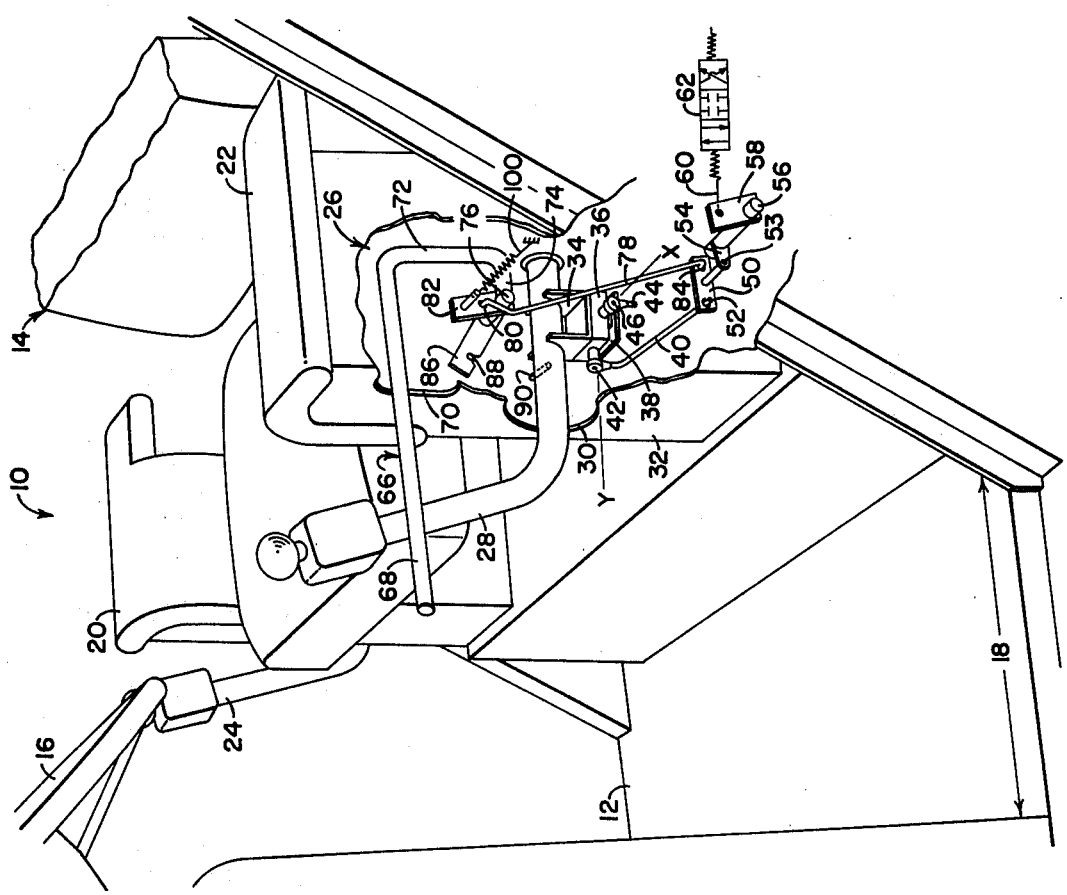

LINKAGES FOR MOVING AND RETAINING A CONTROL LEVER TO AND IN A NON-USE POSITION

BACKGROUND OF THE INVENTION

The present invention relates to a safety lever or bar incorporated in a control linkage for controlling remote devices attached to a vehicle and more specifically relates to a safety lever which is selectively operable for preventing accidental operation of a control lever, as when the operator is moving between the vehicle seat and the doorway of the cab.

Control levers that are positioned within a cab so as to be convenient to reach from the seat of the vehicle are often an obstacle to operator entry and exit, and when bumped, can initiate operation of a controlled device, thus creating a safety hazard. U.S. Pat. No. 3,691,867 issued on Sept. 19, 1972 to Bradshaw is directed to solving the problem of this safety hazard. Thus, the Bradshaw patent discloses a safety lever movable between a transmission-unlocking position wherein the safety lever is disposed so as to block the exit of an operator from a vehicle seat and a locking position wherein the safety lever no longer blocks the exit of the operator, the lever then being positioned so as to lock the transmission shift lever in a neutral position. Means are provided in conjunction with the safety lever for neutralizing the transmission shift lever if it is in another position besides neutral when the safety lever is moved from its unlocking position to its locking position.

One drawback of the Bradshaw device is that even though the safety lever acts to lock the transmission linkage in its neutral position, the shift lever still remains an obstacle to the movement of the operator when exiting or entering the cab.

SUMMARY OF THE INVENTION

According to the present invention, there is provided a novel control linkage mounted in a vehicle cab and specifically there is provided a novel linkage incorporating means for preventing inadvertent actuation of a control lever, as when an operator is entering or exiting from the vehicle cab.

An object of the invention is to provide a control linkage constructed such that a safety lever serves not only to prevent inadvertent actuation of the control lever but also serves to move the control lever from a normal use position wherein it presents an obstacle to an operator moving between a vehicle seat and cab door opening to a non-use position wherein the control lever is no longer such an obstacle.

Another object is to provide a safety lever which is interlocked with a control lever such that the control lever may be operated without any movement being transferred to the safety lever when the latter is positioned so as to block the path between the seat and door opening.

These and other objects will become more apparent from reading the following description in conjunction with the appended drawings.

BRIEF DESCRIPTION OF THE DRAWINGS

FIG. 1 is a left side perspective view showing a portion of a cab in which is located a control linkage constructed according to the principles of the present invention with the safety bar being shown in a normal position permitting normal operation of the control linkage.

FIG. 2 is a view similar to that of FIG. 1 but showing the safety bar in a locking position wherein it holds the control lever in a stored position.

DESCRIPTION OF THE PREFERRED EMBODIMENT

Referring now to the drawing, a cab is partly shown at 10 and includes a floor 12 on which is supported an operator seat 14 located centrally in the cab and just rearwardly of a steering wheel shown partly at 16. The left side of the cab 10 is provided with a door opening 18 for permitting passage of an operator to and from the interior of the cab 10.

The seat 14 includes right and left box-like arm rest structures 20 and 22, respectively, which support and partially contain right and left control linkages 24 and 26, respectively, which are provided for controlling the operation of various hydraulic functions for positioning equipment attached to the vehicle with which the cab 10 is associated. Inasmuch as only the left control linkage 26 is involved in the invention, it is the only linkage that is described in detail.

Specifically, the control linkage 26 includes a generally L-shaped control lever 28 having a lower leg portion extending fore-and-aft through an opening 30 provided in an upright forward wall 32 of the left arm rest structure 22. The lower leg portion of the control lever 28 has a mounting bracket 34 fixed to the underside thereof and to the top of a pivot structure 36 which is universally connected, in a manner not shown, to a fixed base member 38 located within the arm rest structure 22. Thus, the control lever 28 is rockable fore-and-aft about a horizontal transverse axis X and is sideways shiftable about a horizontal longitudinal axis Y. A first motion transmitting link 40 has its upper end universally pivotally connected as at 42 to the pivot structure 36 and a second motion transmitting link 44 has its upper end universally pivotally connected as at 46 to the pivot structure 36, the pivot connections 42 and 46 respectively being located on the axes Y and X when the control lever 28 is in a normal neutral position as shown in FIG. 1. The lower end of the first motion transmitting link 40 is pivotally connected, as at 52, to the forward end of an interlock link 50 pivotally connected intermediate of its ends, as at 53, to the outer end of an input crank arm 54 fixed to a rock shaft 56. An output crank arm 58 is also fixed to the rock shaft 56 and has its outer end linked, as indicated by the dashed line 60, to a spring-neutralized, three position, four-way hydraulic control valve 62. As the second motion transmitting link 44 is not involved in the present invention, its connection with an associated control valve is not shown for the sake of simplicity.

The control linkage 26 is provided with means for preventing the control lever 28 from being accidentally bumped to cause valve actuation during movement of an operator from the seat 14 through the door opening 18. Specifically, the control linkage 26 includes a safety lever or bar 66 fashioned from a rod which, when viewed in a normal position shown in FIG. 1, includes a horizontal portion 68 that projects through an opening 70 provided in the forward wall 32 of the left arm rest structure 22 so as to be in the path of movement of an operator attempting to move from the seat 14 to the door opening 18. Such disposition of the lever 66 is for the purpose of reminding the operator that he should move the safety lever 66 to its locking position shown in FIG. 2 for moving and retaining the control lever 68 to and in a stored or non-use position, in a manner to be presently described, before exiting from the cab 10. Joined to the rear end of the horizontal portion 68 of the safety lever 66 is a vertical portion 72 which has a lower terminal end joined to the rear end of a relatively short horizontal portion 74 which has its forward end fixed to a horizontal transverse pivot shaft 76 rotatably mounted in a conventional manner, not shown. The upper end of a motion transmitting link 78 is pivotally connected as at 80 to a crank arm 82 fixed to the pivot shaft 76 and the lower end of the link 78 is pivotally connected as at 84, to a rear end of the interlock link 50 at the opposite side of the pivotal connection 53 from the pivotal connection 52.

Thus, it will be appreciated that when the safety lever 66 is pushed downwardly from its normal operating position shown in FIG. 1, the crank arm 82 will be caused to rotate counterclockwise to effect downward movement to the motion transmitting link 78 to in turn effect clockwise movement of the interlock link 50 resulting in upward movement of the motion transmitting link 40 and clockwise rotation of the pivot structure 36 about the transverse axis X. As the structure 36 so moves about the axis X, the control lever 28 is moved to a non-use or stored position shown in FIG. 2, this position being reached when the safety bar 66 reaches its locked position shown in FIG. 2 wherein the portion 72 extends horizontally through the opening 70 and the portion 68 extends vertically alongside the front wall 32 of the left arm rest structure 22.

For the purpose of preventing the control lever 28 from being moved out of its stored position shown in FIG. 2 when the safety lever 66 is in its locking position shown in FIG. 2, a lock arm 86 is fixed to the pivot shaft 76 and has a notch 88 located in an under edge portion thereof, the notch 88 engaging a pin 90 fixed to the right side of the lever 26 when the safety lever 66 is in its locked position. A helically coiled extension spring 100 is connected between an outer end portion of the crank arm 82 and the arm rest structure 22 such that it acts on one side of the axis of movement of the pivot shaft 76 so as to maintain the safety lever 66 in its operating position shown in FIG. 1 and moves over center to act on the other side of the axis of movement of the pivot shaft 76 so as to maintain the safety lever 66 in its locking position shown in FIG. 2.

The operation of the invention is as follows. Assuming the operator to be seated in a seat 14, the control linkage 26 will normally be in the condition shown in FIG. 1 wherein the safety lever 66 is in its normal position with the portion 68 extending horizontally into the path that an operator would normally take when exiting from the cab 10. With the safety lever 66 so positioned, the pivotal connection 84 will be aligned with the axis of pivotal movement of the rock shaft 56 and the spring 100 will act to maintain the safety lever 66 in its normal position and will at the same time act to keep the pivotal connection 84 located on the axis of rotation of the rock shaft 56. Thus, the control lever 28 may be moved fore-and-aft about the transverse pivot axis X to actuate the valve 62 without causing any motion to be transmitted to the safety lever 66 since the interlock link 50 will pivot about the connection 84. Side-to-side motion of the control lever 28 will of course, also be ineffective to cause motion of the safety linkage 64 since the motion will take place about the longitudinal pivot axis Y and thus leave the motion transmitting link 40 undisturbed.

If the operator then wishes to exit from the cab from the seat 14, he needs only to press downwardly on the safety lever 66 to move it to its locked position shown in FIG. 2. As the safety bar 66 is moved downwardly, the motion transmitting link 78 will move downwardly to effect rotation of the interlock link 50 about the pivotal connection 53 so as to cause upward movement of the motion transmitting link 40 and the control lever 28. Concurrent with downward movement of the safety lever 66 and upward movement of the control lever 28 is downward movement of the lock arm 86 and upward movement of the pin 90, the pin 90 and notch 88 coming into engagement with each other when the safety lever 66 reaches its locking position shown in FIG. 2. The spring 100 then acts to retain the safety lever 66 in its locking position and thus acts to retain the control lever 28 in its stored position wherein the forward portion thereof is adjacent the upright forward wall 32 of the left arm rest 22. The operator then can exit from the cab without the control lever 28 or the safety lever 66 being in his path of movement and without fear of knocking the control lever 28 into a position which will cause accidental operation of the function controlled by the valve 62 or of the function controlled by the valve (not shown) connected to the motion transmitting link 44.

We claim:
1. In a combination of a control linkage including a control lever mounted for pivotal movement in at least one plane between a neutral position and at least one actuating position, an output member mounted for rotation about a first axis, first motion transmitting means connected between the lever and the output member for causing movement of the latter between neutral and actuating positions corresponding to the neutral and actuating positions of the lever, biasing means connected to the output member for yieldably maintaining the latter in its neutral position, and a safety bar mounted in the vicinity of the lever for pivotal movement in a plane extending generally parallel to the one plane between a normal position disposed free of the control linkage and a locking position engaged with the control linkage for preventing movement of the output member from its neutral position, the improvement comprising: said first motion transmitting means including a first link pivotally connected to a first end of an interlock link having a second end and being pivotally connected between its first and second ends to the output member for movement about a second axis extending parallel to the first axis; a second motion transmitting means connecting the safety bar to the interlock link and including a second link pivotally connected to the second end of the interlock link at a location chosen so as to lie on the first axis when the safety bar is in its normal position; said lever being movable in the first plane to a non-use position; the first and second motion transmitting means and the interlock link being dimensioned and arranged such that movement of the lever when the safety bar is in its normal position will result in movement of the interlock link about the first axis for effecting movement of the output member and movement of the safety bar will result in movement of the interlock link about the second axis for effecting movement of the control lever, the latter movement disposing the control lever in the non-use position when the safety bar is in its locking position; and lock means, including first means fixed for movement with the safety bar and second means fixed for movement with the control lever, disposed for engagement only when the safety bar is in its locking position and the control lever is in its non-use position.

2. In combination with a vehicle cab having a door opening, a passageway extending between the opening and a front side of a seat located in the cab, and the seat including a hollow arm rest structure located adjacent the opening and having an upright front wall, a linkage assembly comprising: a generally L-shaped control lever having a lower leg portion extending fore-and-aft through an opening provided in said front wall and having an upper leg portion extending upwardly in front of said front wall; mounting means in the arm rest structure connected to the lower leg portion and defining a first horizontal transverse pivot axis about which the lever is movable among neutral, first actuating and non-use positions wherein the upper leg portion is disposed so as to respectively extend at a first angle from, at a second angle less than the first angle from and upwardly along the front wall; a pivot shaft rotatably mounted in the arm rest, at a location above the lever, for movement about a second horizontal transverse axis; a safety bar having an end fixed to the shaft and including an elongate first portion disposed generally perpendicular to said second axis and projecting through a second opening in said front wall; said bar being swingable about said second axis between a normal position, wherein the elongate first portion of the bar extends fore-and-aft through the second opening in the front wall and extends into the passageway, and a locked position wherein the first portion extends downwardly along the front wall; an output member mounted below the lever for rotation about a third horizontal transverse pivot axis between neutral and actuating positions respectively corresponding to the neutral and actuating positions of the lever; first biasing means connected to the output member for normally yieldably maintaining the latter in its neutral position; a fore-and-aft extending interlock link pivotally connected intermediate of opposite first and second ends thereof to the output member for rotation about a fourth horizontal transverse axis; a first motion transmitting means connected to the lever including a first link pivotally connected to the first end of the interlock link, a second motion transmitting means connected to the safety bar and including a second link pivotally connected to the second end of the interlock link at a location so chosen that it lies on said third axis when the safety bar is in its normal position; said first and second motion transmitting means and said interlock link being constructed such as to cause said lever to be moved to its non-use position when the safety bar is moved to its locked position; and lock means connected partly to the lever and partly to the safety bar so as to releasably retain the lever in its non-use position only when the safety bar is in its locked position.

3. In a control linkage of a type including an output member mounted for rotation about a first axis for movement between at least a neutral position and a first actuating position and first and second motion transmitting links respectively including control and safety input levers for controlling the operation of the output member, comprising: an interlock link pivotally connected to the output member for rotation about a second axis extending parallel to the first axis; said first motion transmitting linkage being connected between the control lever and the interlock link and including a link pivotally connected to one end of and arranged for movement transverse to the interlock member; said second motion transmitting linkage being connected between the safety lever and the interlock link and including a second link pivotally connected to another end of and arranged for movement transverse to the interlock member at a location which lies on said first axis when the safety lever is in a normal position; first biasing means yieldably retaining said safety lever in said normal position; second biasing means yieldably retaining the output member in its neutral position whereby the control lever may be moved between a neutral and an actuating position for causing movement of the interlock link about the first axis so as to effect movement of the output member between its neutral and actuated positions; said safety lever being mounted for movement from its normal position to a locking position and connected to the second link so as to cause the latter to effect rotation of the interlock link about said second axis to in turn transfer movement via the first link to effect movement of the control lever to a non-use position; and releasable lock means connected to the first and second motion transmitting links for locking the control lever in its non-use position only when the safety lever is moved to its locking position.

4. In a linkage system for controlling operation of a controlled element through means of a control lever, mounted for movement at least between a neutral and a first position for respectively effecting movement of the controlled element between corresponding neutral and first positions, and a safety lever connected to a locking member and mounted for movement between a first position wherein the locking member is held away from the control lever and a second position wherein the locking member is engaged with the control lever so as to prevent movement of the controlled element to its first position through means of the control lever; the improvement comprising: intermediate link means connecting the safety lever to the control lever and the control lever to the controlled element for effecting operation of the controlled element via the control lever only when the safety lever is in its first position.

* * * * *